United States Patent Office 2,879,204
Patented Mar. 24, 1959

2,879,204

VITAMIN $B_{12}$ RECOVERY PROCESS

Pierre Barthelemy, Saint - Germain - en - Laye, Lucien Penasse, Paris, and Gérard Nomine, Noisy-le-Sec, France, assignors to UCLAF, Paris, France, a corporation of France No Drawing. Application May 22, 1956
Serial No. 586,396

Claims priority, application France May 5, 1956

8 Claims. (Cl. 167—81)

This application relates to vitamin $B_{12}$, and more particularly to well defined derivatives of vitamin $B_{12}$, and to a method of utilizing these new compounds for directly recovering vitamin $B_{12}$ from its natural sources.

It is one object of the present invention to provide a new process for the recovery of vitamin $B_{12}$ from its natural sources.

Another object of the present invention is to provide new and valuable vitamin $B_{12}$ compounds, namely complex compounds formed by the action of zinc-cuprocyanide on vitamin $B_{12}$.

A furthur object of the present invention is to provide a process of preparing such a new and valuable derivative of vitamin $B_{12}$.

Other objects of the present invention and advantageous features thereof will become apparent as the description proceeds.

In principle, the present invention consists in providing a new process for the recovery of crystalline vitamin $B_{12}$, also named cyanocobalamine. The general formula of vitamin $B_{12}$ is: $C_{63}H_{90}N_{14}O_{14}PCo$ and its constitution has been elucidated by Todd et al. (Nature, 1955, 176, 328). The new process of the present invention proceeds by causing zinc-cuprocyanide to act on very dilute solutions of vitamin $B_{12}$, such as fermentation broth, but can also be used in vitamin $B_{12}$ recovery from other natural sources such as sewage, liver-extracts and very dilute solutions of the pure product.

It is known that the vitamin $B_{12}$ concentration of a fermentation broth (cyano-cobalamine is ordinarily produced by the fermentation of microorganisms such as Schizomycetes, Eumycetes and Myxomycetes, especially Streptomyces) is very low and generally around 1 p.p.m.

The known methods for the recovery of vitamin $B_{12}$ proceed by successive steps, starting generally with a preliminary adsorption on active charcoal, a filtering earth or an ion exchange resin from which cyanocobalamine is eluted together with impurities of similar solubility. Further purification is then effected by countercurrent extraction with benzyl alcohol or by alternating dissolution in a water-immiscible solvent and in water. According to this process, the aqueous solutions are extracted by a solvent or solvent mixture which is insoluble in water; a solvent is then added in which vitamin $B_{12}$ is insoluble and the vitamin is extracted with water. Solutions of vitamin $B_{12}$ in substituted or unsubstituted phenols can be extracted by aqeous pyridine. Finally, by means of repeating the distribution process between aqeous and organic layers, it is possible to further purify the product. Finally by chromatography on alumina or ion exchange resin a vitamin $B_{12}$ solution is obtained, the purity of which is about 90%. Precipitation by acetone, followed by one or several recrystallisations, yields usually the pure compound. The extreme dilution of the starting material and the low selectivity of the first adsorbent yield a concentration of about 5/100,000 after the first treatment (i. e. 50γ of vitamin $B_{12}$ per gram of absorbent) and entail numerous operations, the use of many different solvents and adsorbents on a large scale, and the handling of large volumes. This involves the burdensome recovery of used solvents.

It was, therefore, of interest and importance to provide the industry with a recovery process which avoids those multifarious operations with large volumes.

The process according to the present invention achieves such advantages by causing formation of zinc-cuprocyanide in a very dilute solution of vitamin $B_{12}$, for example, in a fermentation broth in which the mycelium cells have been previously lysed. The complex salt thus formed, combines with vitamin $B_{12}$ and an insoluble derivative separates immediately. After filtration or centrifuging a small quantity of a precipitate is obtained from which vitamin $B_{12}$ can be readily recovered by dissolving it in water in the presence of a chelating agent which forms a complex salt with zinc. The vitamin $B_{12}$ is then extracted into a solvent or solvent mixture from which it is reextracted by water before precipitation by means of dioxane. It is evident that neither chromatography nor handling of large volumes is involved in the aforementioned process.

The technical and scientific literature mentions certain processes for precipitating vitamin $B_{12}$ from its concentrated solutions by reaction of an alkali metal cyanide and a soluble salt of zinc i.e. by utilizing zinc cyanide and starting from a material which has been previously concentrated. In contrast to such a method, the process of our invention involves the use of zinc-cuprocyanide which gives, on reacting with a very dilute solution of vitamin $B_{12}$ such as a lysed culture-broth, an insoluble derivative. Said zinc-cuprocyanide is formed by pouring in the solution to be extracted, potassium cuprocyanide $K_3Cu(CN)_4$ and then a soluble salt of zinc such as zinc sulfate or acetate. As it will be shown in the following examples, zinc cuprocyanide allows also a quantitative recovery from a dilute solution which contains pure vitamin $B_{12}$; in contrast thereto, the use of potassium cyanide plus a zinc salt i.e. zinc cyanide in such a solution, results in a very poor recovery.

Potassium cuprocyanide as used in the process of our invention is commercially available and easy to prepare according to known methods. Its formula can be verified by chemical analysis or by physical methods. It is poured into the lysed broth in an amount which exceeds the upper solubility limit of the zinc cuprocyanide, to be formed after the addition of a slight excess of the soluble zinc salt. As the solubility of zinc cuprocyanide in water is about 0.5%, it is clear that a large excess thereof is used with regard to vitamin $B_{12}$. Instead of pouring first the potassium cuprocyanide in the solution and then the zinc salt, it is possible to proceed inversely. In contrast to the precipitate obtained by reacting an alkali metal cyanide with a zinc salt, i.e. a precipitate from which the vitamin $B_{12}$ can be extracted by solvents, the process of the present invention yields a well defined chemical compound from which the vitamin $B_{12}$ cannot be extracted by solvents. Even better, it is possible to extract the zinc-cuprocyanide-vitamin $B_{12}$ compound by means of dimethylformamide, the coprecipitated zinc-cuprocyanide being thus separated therefrom. By adding acetone to such a solution, the zinc-cuprocyanide-vitamin $B_{12}$ compound precipitates unchanged.

In order to recover vitamin $B_{12}$ on an industrial scale, it is generally sufficient to produce a crude precipitate as above mentioned. After filtration or centrifuging, said precipitate is treated with an aqueous solution of a chelating agent such as the sodium salt of ethylene diamino tetracetic acid which forms a complex salt with zinc. Vitamin $B_{12}$ is then extracted by means of an organic solvent from which it is reextracted by means of water before precipitation by addition of dioxane as above indicated.

The following examples serve to illustrate the present invention without, however, limiting the same thereto. They show also the difference compared to the known methods.

It is, of course, understood that other water soluble zinc salts, sodium-cuprocyanide and other broth lysing agents may be used. Furthermore, although it is more convenient to operate at room-temperature and without altering the pH value of the broth, one may heat it to about 80° C. or cool it to +5° C. or render it slightly alkaline without departing from the scope of the present invention.

One may use other chelating agents of zinc than those mentioned, especially the sodium salt of nitrilotriacetic acid, the sodium salt of N-hydroxyethyl-ethylene diamino triacetic acid or other agents capable of forming complex salts with zinc in the form of water soluble derivatives.

Finally, it is evident that any solvent or suitable mixture of solvents may be used for extracting vitamin $B_{12}$ from its aqueous solution after the cation has been chelated. It is also possible to utilize other precipitating solvents than dioxane without departing from the scope of the present invention.

*Example 1*

To 50 ml. of an aqueous $B_{12}$ solution containing 147γ of vitamin $B_{12}$ per ml., there were added 200 mg. of crystalline zinc acetate $((CH_3CO_2)_2Zn,2H_2O)$. To this solution there were added 100 mg. of potassium cyanide. A precipitate of zinc cyanide is formed which adsorbs some vitamin $B_{12}$. After standing overnight, the precipitate was removed by filtration. The remaining solution was titrated; it contained still 143γ of vitamin $B_{12}$ per ml.

If to the same starting solution there were added 200 mg. of zinc acetate and, instead of potassium cyanide, the same quantity of potassium cuprocyanide $(K_3Cu(CN)_4)$, a pink precipitate of vitamin $B_{12}$-zinc cuprocyanide formed immediately which contained an excess of zinc-cuprocyanide. After standing overnight, the precipitate was removed by filtration. The remaining colorless solution was titrated; it contained no more vitamin $B_{12}$.

*Example 2*

To 1000 ml. of an aqueous solution containing 2.110 mg. of pure vitamin $B_{12}$, there were added 2 g. of potassium cuprocyanide and 3 g. of zinc sulfate dissolved in 30 ml. water. After decanting the supernatant liquid, filtration was effected after adding a small quantity of filtering earth. The filtrate was colorless and contained no more vitamin $B_{12}$. The precipitate was dissolved in 25 ml. of an aqueous solution of the sodium salt of ethylene diamino-tetracetic acid. Filtration was effected in order to remove the filtering earth which was washed three times with 5 ml. of water. To the filtrate and wash waters, there were added 20 g. of ammonium sulfate and extraction of the vitamin $B_{12}$ was effected by means of amyl alcohol in order to eliminate impurities. The amyl alcohol solution was then extracted with water. The titration of the obtained aqueous solution showed that 2.104 mg. of vitamin $B_{12}$ were present; the recovery yield was 99% and the product could be crystallized directly by addition of 10 times its volume of dioxane.

*Example 3*

To 10 liters of a *S. olivaceus* fermentation broth containing 1500γ of vitamin $B_{12}$ per liter there were added 260 g. of calcium chloride. The mixture was agitated for three hours at 50° C. in order to induce the lysis of the mycelium, filtered and the filtrate allowed to cool to room temperature before addition of 20 g. of potassium cuprocyanide. After complete dissolution, a solution of 30 g. of zinc sulfate in 300 ml. water was added. After decanting the supernatant liquid, allowing the precipitate to stand overnight, filtration was effected on a filter press after addition of a filter-aid (10 g. Hyflo-Super Cel) and the precipitate was washed on the filter with 3 liters of water. The filtrate and wash waters did not contain any vitamin $B_{12}$. To the precipitate suspended in 250 ml. water, there were added 100 g. of the sodium salt of ethylene diamino tetracetic acid and then hydrochloric acid till a pH value of 8.5 was reached. The solution thus obtained was extracted several times by a mixture of phenol-dichlor ethane. The combined organic extracts were washed with water and the wash waters were discarded. To the extracts there was added an equal volume of dichlor ethane in order to render vitamin $B_{12}$ insoluble and extraction was effected with water. The aqueous solution contained, as shown by spectrophotometric titration, 14.5 mg. of vitamin $B_{12}$ i.e. a quantitative recovery yield. Said solution was treated as mentioned above, with 40 mg. of potassium cuprocyanide and 60 mg. of zinc sulfate. The precipitate was separated and the remaining solution contained only 0.264 mg. vitamin $B_{12}$. Working up was effected as indicated above and vitamin $B_{12}$ was liberated from its zinc-cuprocyanide combination, and extracted by means of an organic solvent and by means of water, 10 volumes of dioxane were added to the last aqueous solution and 8 mg. of pure vitamin $B_{12}$ were recovered in the form of long red needles. The mother liquor contained the remainder of the product (6 mg.) and could be concentrated, precipitated and the precipitate recristallized in order to give an important second crop or, more simply, added, after removing of the solvent, to a new batch for recovering of vitamin $B_{12}$, after the second precipitation by zinc cuprocyanide.

We claim:

1. In a process of precipitating the substantially water-insoluble zinc cuprocyanide-vitamin $B_{12}$ complex compound from an aqueous solution containing said vitamin and impurities, the steps which comprise producing zinc cuprocyanide in said vitamin $B_{12}$-containing solution by adding first an alkali metal cuprocyanide and subsequently a water soluble zinc salt to said vitamin $B_{12}$-containing solution, thereby precipitating the zinc cuprocyanide-vitamin $B_{12}$ complex compound, and separating said precipitated complex compound from the solution.

2. In a process of recovering vitamin $B_{12}$ from an aqueous solution containing said vitamin and impurities, the steps which comprise producing zinc cuprocyanide in said vitamin $B_{12}$-containing solution, by adding first an alkali metal cuprocyanide and subsequently a water soluble zinc salt to said vitamin $B_{12}$-containing solution, thereby precipitating the zinc cuprocyanide-vitamin $B_{12}$ complex compound, separating said precipitated complex compound from the solution, treating the resulting precipitate with an aqueous solution of a chelating agent forming a water soluble zinc salt, extracting vitamin $B_{12}$ from the resulting aqueous solution by means of a mixture of phenol and dichloro ethane, adding dichloro ethane to the resulting extract of the mixture of phenol and dichloro ethane to precipitate vitamin $B_{12}$, dissolving the precipitated vitamin $B_{12}$ in water, and adding to the resulting aqueous solution dioxane to precipitate substantially pure vitamin $B_{12}$.

3. The process according to claim 2, wherein the chelating agent is an agent selected from the group consisting of the sodium salt of ethylene diamino tetraacetic acid, the sodium salt of N-hydroxy ethyl ethylene diamino triacetic acid, and the sodium salt of nitrilo triacetic acid.

4. In a process of precipitating the substantially water-insoluble zinc cuprocyanide-vitamin $B_{12}$ complex compound from fermentation broth containing said vitamin $B_{12}$ and impurities, the steps which comprise producing zinc cuprocyanide in said fermentation broth by adding first an alkali metal cuprocyanide and subsequently a water soluble zinc salt to said fermentation broth, thereby precipitating the zinc cuprocyanide-vitamin $B_{12}$ complex compound, and separating said precipitated complex compound from the fermentation broth.

5. In a process of recovering vitamin $B_{12}$ from fermentation broth containing said vitamin $B_{12}$ and impurities, the steps which comprise producing zinc cuprocyanide in said fermentation broth by adding first an alkali metal cuprocyanide and subsequently a water soluble zinc salt to said fermentation broth, thereby precipitating the zinc cuprocyanide-vitamin $B_{12}$ complex compound, separating said precipitated complex compound from the fermentation broth, treating the resulting precipitate with an aqueous solution of a chelating agent forming a water soluble zinc salt, extracting vitamin $B_{12}$ from the resulting aqueous solution by means of a mixture of phenol and dichloro ethane, adding dichloro ethane to the resulting extract of the mixture of phenol and dichloro ethane to precipitate vitamin $B_{12}$, dissolving the precipitated vitamin $B_{12}$ in water, repeating said steps of precipitating the zinc cuprocyanide-vitamin $B_{12}$ complex compound, splitting up the complex compound by a treatment with a chelating agent which forms a water soluble zinc salt, extracting the vitamin $B_{12}$ by means of a phenoldichloro ethane mixture, transferring the vitamin $B_{12}$ to an aqueous phase with dichloro ethane, and precipitating the vitamin $B_{12}$ from the aqueous phase by the addition of dioxane, thereby producing substantially pure vitamin $B_{12}$.

6. The process according to claim 5, wherein the chelating agent is an agent selected from the group consisting of the sodium salt of ethylene diamino tetraacetic acid, the sodium salt of N-hydroxy ethyl ethylene diamino triacetic acid, and the sodium salt of nitrilo triacetic acid.

7. In a process of recovering vitamin $B_{12}$ from an aqueous solution containing said vitamin and impurities, the steps which comprise producing zinc cuprocyanide in said vitamin $B_{12}$-containing solution by adding first an alkali metal cuprocyanide and subsequently a water soluble zinc salt to said vitamin $B_{12}$-containing solution, thereby precipitating the zinc cuprocyanide-vitamin $B_{12}$ complex compound, separating said precipitated complex compound from the solution, treating the resulting precipitate with an aqueous solution of a chelating agent forming a water soluble zinc salt, extracting vitamin $B_{12}$ from the resulting aqueous solution by means of amyl alcohol, extracting the resulting extract in said amyl alcohol with water, and adding to the resulting aqueous extract dioxane in which vitamin $B_{12}$ is insoluble, in an amount sufficient to precipitate substantially pure vitamin $B_{12}$.

8. The substantially water-insoluble zinc cuprocyanide-vitamin $B_{12}$ complex compound having a pink color, said complex compound being stable and not being decomposed on treatment with organic solvents, said complex compound being soluble in dimethyl formamide and being precipitated from its solution in dimethyl formamide by the addition of acetone, said complex compound being split up to form vitamin $B_{12}$ by treatment with an aqueous solution of a chelating agent forming a soluble complex salt with zinc, said zinc cuprocyanide-vitamin $B_{12}$ complex compound being prepared by adding an alkali metal cuprocyanide and a water soluble zinc salt to an aqueous solution containing vitamin $B_{12}$ and separating the precipitated complex compound from the solution.

References Cited in the file of this patent
UNITED STATES PATENTS

| | | |
|---|---|---|
| 2,621,144 | Holland | Dec. 9, 1952 |
| 2,648,592 | Stanton | Aug. 11, 1953 |
| 2,678,900 | Denkewalter | May 18, 1954 |